(12) United States Patent
Bandaru et al.

(10) Patent No.: US 11,941,125 B2
(45) Date of Patent: Mar. 26, 2024

(54) AUTOMATIC UPDATE OF VM SETS

(71) Applicant: Microsoft Technology Licensing, LLC, Redmond, WA (US)

(72) Inventors: Uday Kumar Bandaru, Sammamish, WA (US); Ravindra Nath Bhartiya, Sammamish, WA (US); Shashank Gupta, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 84 days.

(21) Appl. No.: 17/200,902

(22) Filed: Mar. 14, 2021

(65) Prior Publication Data

US 2022/0292197 A1    Sep. 15, 2022

(51) Int. Cl.
  *G06F 21/57* (2013.01)
  *G06F 9/455* (2018.01)
  *G06F 21/55* (2013.01)
  *G06F 21/62* (2013.01)

(52) U.S. Cl.
  CPC .......... *G06F 21/57* (2013.01); *G06F 9/45558* (2013.01); *G06F 21/554* (2013.01); *G06F 21/6218* (2013.01); *G06F 2009/45587* (2013.01)

(58) Field of Classification Search
  CPC .... G06F 21/57; G06F 21/554; G06F 21/6218; G06F 9/455; G06F 9/45558; G06F 2009/45587
  See application file for complete search history.

(56) References Cited

U.S. PATENT DOCUMENTS

| | | | |
|---|---|---|---|
| 9,141,381 B2 | 9/2015 | Siddegowda | |
| 9,507,586 B2 * | 11/2016 | Kamble | G06F 9/45558 |
| 9,641,406 B1 | 5/2017 | Allen | |
| 9,697,019 B1 * | 7/2017 | Fitzgerald | H04L 41/08 |
| 9,740,472 B1 | 8/2017 | Sohi et al. | |
| 9,747,287 B1 | 8/2017 | Bhardwaj et al. | |
| 9,996,381 B1 | 6/2018 | Raju et al. | |
| 10,083,059 B1 | 9/2018 | Singh et al. | |
| 11,025,483 B1 * | 6/2021 | Hashmi | H04L 63/164 |
| 11,086,874 B2 * | 8/2021 | Byard | G06F 16/256 |

(Continued)

OTHER PUBLICATIONS

"Storing and retrieving instance metadata", https://web.archive.org/web/20160903092203/https://cloud.google.com/compute/docs/storing-retrieving-metadata, Sep. 3, 2016, 36 Pages.

(Continued)

*Primary Examiner* — Gary S Gracia
(74) *Attorney, Agent, or Firm* — Barta Jones, PLLC

(57) ABSTRACT

Cloud services intelligently provision new VMs for a VM scale set when the original label that included the OS or other software images used to provision existing VMs of the VM scale set is no longer available or has been changed. Metadata of the existing VMs are analyzed to identify an OS image or other software image used to provision the existing VMs. The metadata also reveals updates that are running on the new VMs. These updates include software that was not part of the original label used to provision the existing VMs and are used to find the second label in a label database. The second labels include the OS or software of the existing VMs—or a later version thereof—and some portion of the updates. A VM-provisioning service uses the second label to provision the new VM.

20 Claims, 12 Drawing Sheets

(56) References Cited

U.S. PATENT DOCUMENTS

| | | | |
|---|---|---|---|
| 11,385,919 B1* | 7/2022 | Gafton | G06F 16/5866 |
| 2008/0184225 A1* | 7/2008 | Fitzgerald | G06F 9/45558 |
| | | | 718/1 |
| 2013/0185716 A1* | 7/2013 | Yin | H04L 67/1095 |
| | | | 718/1 |
| 2014/0123136 A1 | 5/2014 | Beda et al. | |
| 2014/0325514 A1* | 10/2014 | Benedetti | G06F 8/65 |
| | | | 718/1 |
| 2015/0081910 A1 | 3/2015 | Assuncao et al. | |
| 2016/0117163 A1* | 4/2016 | Fukui | G06F 8/65 |
| | | | 717/171 |
| 2016/0306618 A1* | 10/2016 | Bansod | G06F 8/65 |
| 2016/0378456 A1* | 12/2016 | Chai | H04L 67/34 |
| | | | 717/169 |
| 2017/0070563 A1* | 3/2017 | Sundermeyer | H04L 67/025 |
| 2020/0042298 A1* | 2/2020 | Jain | G06F 11/1484 |
| 2021/0303367 A1* | 9/2021 | Keller | H04L 41/0816 |

OTHER PUBLICATIONS

Robbins, et al., "Azure virtual machine scale set automatic OS image upgrades", Retrieved from: https://docs.microsoft.com/en-us/azure/virtual-machine-scale-sets/virtual-machine-scale-sets-automatic-upgrade, Jun. 26, 2020, 15 Pages.

"International Search Report and Written Opinion Issued in PCT Application No. PCT/US22/018408", dated Jun. 20, 2022, 13 Pages.

* cited by examiner (Time 1)

FIG. 5 (Time 3)

AUTOMATIC UPDATE OF VM SETS

BACKGROUND

One service of cloud-computing infrastructures is the provisioning of virtual machines (VMs). To provide redundancy and improved performance, applications run in the cloud are typically distributed across multiple VMs. A load balancer distributes application requests to one of the VM instances that are provisioned to run the application. To keep up with additional customer demand, clients often need to increase the number of VMs running an application. Today, clients are able to create and manage a group of VMs to facilitate a host of applications, scaling the number of VMs up or down to facilitate requisite processing, memory, and networking resources.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Examples and implementations disclosed herein are directed to intelligently provisioning new VMs for a VM scale set when the original label that included the software images used to provision existing VMs is no longer available or has changed. A VM-metadata service analyzes the metadata of the existing VMs of the VM scale set. The OS image or other software is identified from the metadata along with additional software updates that have been installed, or are running, on the existing VMs. These updates include software that was not part of the original label used to provision the existing VMs, but the updates provide additional features that may be searched to identify a suitable second label for provisioning the new VM. For example, a software update may include a specific security patch or registry keys installed on the existing VMs. These updates are used to find the second label in a label database. The second labels include the software of the existing VMs—or a later version thereof—and some portion of the updates (e.g., security patch, registry keys, etc.). A VM-provisioning service uses the identified second label to provision the new VM.

BRIEF DESCRIPTION OF THE DRAWINGS

The disclosed examples are described in detail below with reference to the accompanying drawing figures listed below.

DETAILED DESCRIPTION

Figure 1:
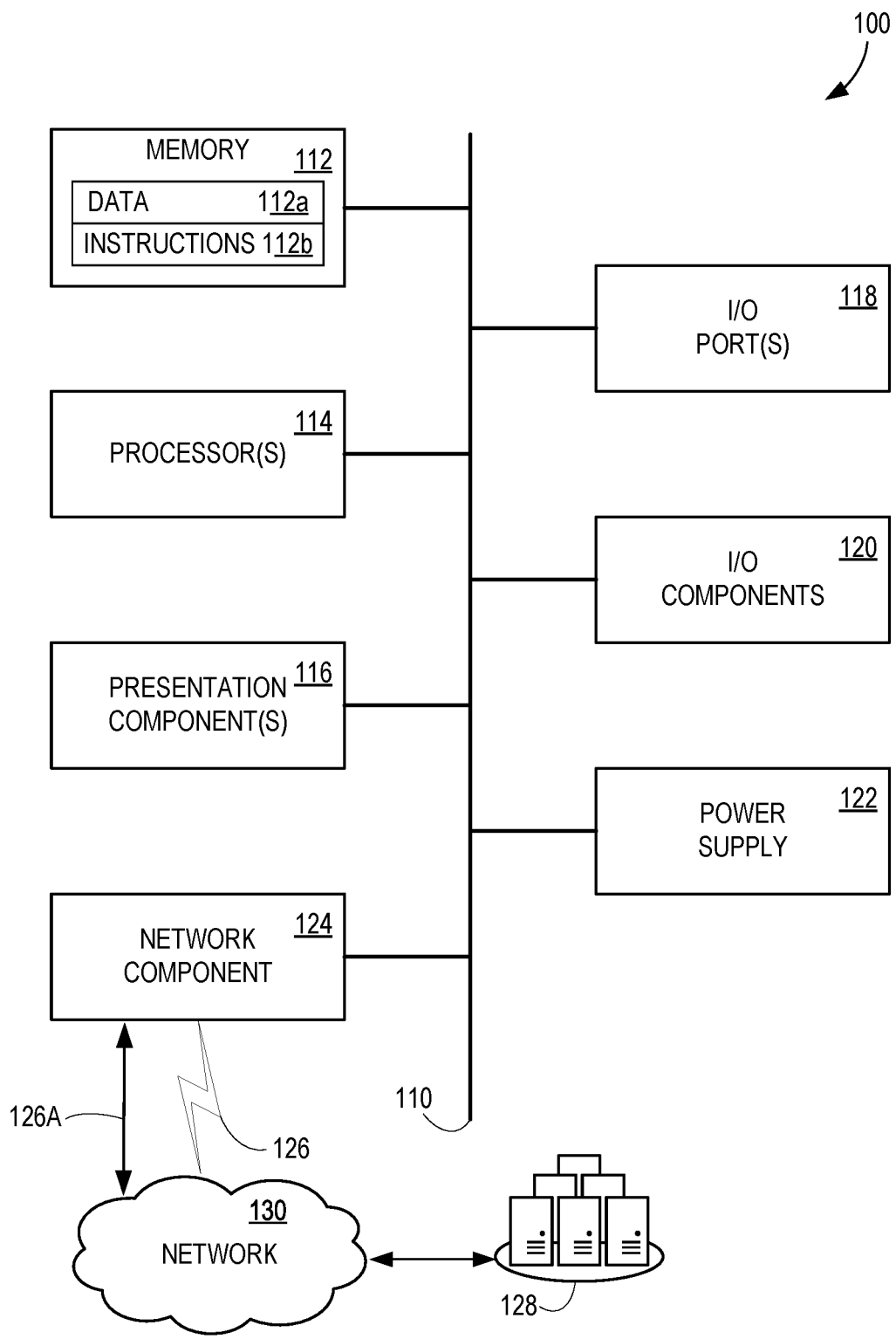
FIG. 1 illustrates a block diagram of an example computing device for implementing aspects disclosed herein.

The various implementations and examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

Provisioning platforms allow a systems administrator to select, configure, and push a set of software to new machines on a network. Existing provisioning platforms have to make manual selections and perform other tasks manually in order to install new VMs. For sets of VMs, the installation difficulties are compounded, since different sets of virtual machines may be configured to use different set of available resources, and/or can be instantiated using management tools from different vendors that may or may not be fully compatible.

When multiple VMs are needed to run an application, it is very important to maintain a consistent VM software configuration across the entire set of VMs. In particular, the software images for an OS that is currently running on one VM may not be available or may have changed when the provisioning service attempts to create another VM at a later time. For example, if ten VMs were created in December 2020 to run version 782 of the WINDOWS® OS (developed by the MICROSOFT CORPORATION® headquartered in Redmond, Wash.) but a new VM needs to be created in July 2021, the 782 version of WINDOWS® (i.e., December 2020 version) may be obsolete, changed, or no longer available to the VM-provisioning service. As a result, the VM-provisioning service is not able to create the new VM with the old 782 version of the WINDOWS® OS, creating an error that requires the customer wanting the VM to contact customer support. Put another way, the images used by a provisioning service to create new VMs are constantly changing to plug security vulnerabilities or being phased out as software and hardware evolves. Requiring customers to reach out to customer support is an inefficient way to add more VMs to a specific VM scale set. As a result, known provisioning services and platforms do not provide a fully automated experience when new VMs need to be created for a current VM scale set running obsolete or changed software.

The disclosed implementations and examples relate to systems, methods, and computer-executable instructions for automatically, and intelligently, provisioning new VMs for a VM scale set. The disclosed implementations operate in a cloud-computing infrastructure (referred to generally herein as the "cloud," "cloud-computing environment," or "cloud infrastructure") that includes a VM-provisioning service and a VM-metadata service. The VM-provisioning service provisions new VM instances for the VM scale set so that a client is able to add processing resources in the cloud. The VM-metadata service analyzes the metadata of existing operational VMs in the VM scale set, identifies the particular software (e.g., operating system (OS)) running on the VMs, and also identifies the latest configurations of the identified software that have been downloaded from an update service. The update service automatically updates the virtualized software and hardware of the existing VMs, and these updates include identifiable metadata indicating specifics about the OS or other software of the existing VMs, such as, for example but without limitation.

Cloud infrastructures include images of software, such as an OS, for installation on the VMs. Provisioning a new VM involves, among many steps, copying these software images to the memory space allocated to support the new VM. But these cloud-stored images for the OS or other software may have changed from the images used to provision the existing VMs in the VM scale set. For example, an existing VM may have been provisioned with an image that includes a WINDOWS® 10 2004 version of the OS with an October 2020 security patch; yet, the image in the cloud at the time the new VM is being provisioned may include the 2004 version of the OS with a December 2004 (or other) security patch. Provisioning the new VM with the different security patch may lead to unintended consequences because the new VM differs from the existing VMs—because of the differences in the security patches.

Traditionally, this created an error that a cloud customer would need to reach out to customer support to resolve. But now, using the disclosed implementations and examples, the correct images to use in provisioning the new VM are machine-learned through analyzing metadata of the existing VMs. And the new VM is able to be automatically provisioned to match the existing VMs of the VM scale set. This eliminates errors from trying to provision new VMs with software that has been changed or become obsolete. Also, and perhaps more importantly, the disclosed examples reduce the need for clients to contact customer support in order to get their VMs created when software changes or becomes obsolete.

To aid the reader, "existing" VMs means VMs that are currently running as part of a VM scale set, and "new" VMs are VMs that are scheduled to be added to the VM scale set. In other words, the VM scale set includes one or more existing VMs that are currently running, and the new VMs are added to the VM scale set by a VM-provisioning service. New VMs may be added for a multitude of reasons. For example, an application running on the existing VMs may be backed up, need redundancy, or require additional processing power. Myriad other reasons exist for provisioning the new VMs using the techniques discussed herein.

A "VM scale set" refers to a collection of one or more VMs that may be auto-scaled up or down. In other words, the number of VMs may be increased or decreased in the scale set manually or automatically through application of defined rules to auto-scale based on resource usage (e.g., central processing unit (CPU), graphics processing unit (GPU), application-specific integrated circuit (ASIC), or the like); memory demand; and/or network requirements.

Having provided an overview of some of the disclosed implementations and examples and clarified some terminology, attention is drawn to the accompanying drawings to further illustrate additional details. The illustrated configurations and operational sequences are provided to aid the reader in understanding various aspects of the disclosed implementations and examples. The accompanying figures are not meant to limit all examples, and thus some examples may include different components, devices, or operations while not departing from the scope of the examples disclosed herein. In other words, some implementations and examples may be embodied or may function in different ways than those shown.

FIG. 1 is a block diagram of an example computing device 100 for implementing aspects disclosed herein, and is designated generally as computing device 100. Computing device 100 is but one example of a suitable computing environment and is not intended to suggest any limitation as to the scope of use or functionality of the examples disclosed herein. Neither should computing device 100 be interpreted as having any dependency or requirement relating to any one or combination of components/modules illustrated.

The examples disclosed herein may be described in the general context of computer code or machine- or computer-executable instructions, such as program components, being executed by a computer or other machine. Generally, program components include routines, programs, objects, components, data structures, and the like that refer to code, performs particular tasks, or implement particular abstract data types. The disclosed examples may be practiced in a variety of system configurations, including personal computers, laptops, smart phones, servers, VMs, mobile tablets, hand-held devices, consumer electronics, specialty computing devices, etc. The disclosed examples may also be practiced in distributed computing environments when tasks are performed by remote-processing devices that are linked through a communications network.

Computing device 100 includes a bus 110 that directly or indirectly couples the following devices: computer-storage memory 112, one or more processors 114, one or more presentation components 116, I/O ports 118, I/O components 120, a power supply 122, and a network component 124. While computing device 100 is depicted as a seemingly single device, multiple computing devices 100 may work together and share the depicted device resources. For example, memory 112 is distributed across multiple devices, and processor(s) 114 is housed with different devices. Bus 110 represents what may be one or more busses (such as an address bus, data bus, or a combination thereof). Although the various blocks of FIG. 1 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 1 and the references herein to a "computing device."

Memory 112 may take the form of the computer-storage memory device referenced below and operatively provide storage of computer-readable instructions, data structures, program modules and other data for the computing device 100. In some examples, memory 112 stores one or more of an OS, a universal application platform, or other program modules and program data. Memory 112 is thus able to store and access data 112a and instructions 112b that are executable by processor 114 and configured to carry out the various operations disclosed herein. In some examples, memory 112 stores executable computer instructions for an OS and various software applications. The OS may be any OS designed to the control the functionality of the computing device 100, including, for example but without limitation: WINDOWS® developed by the MICROSOFT CORPORATION®, MAC OS® developed by APPLE, INC.® of Cupertino, Calif., ANDROID™ developed by GOOGLE, INC.® of Mountain View, California, open-source LINUX®, and the like.

By way of example and not limitation, computer readable media comprise computer-storage memory devices and communication media. Computer-storage memory devices may include volatile, nonvolatile, removable, non-removable, or other memory implemented in any method or technology for storage of information such as computer-readable instructions, data structures, program modules, or the like. Computer-storage memory devices are tangible and mutually exclusive to communication media. Computer-storage memory devices are implemented in hardware and exclude carrier waves and propagated signals. Computer-storage memory devices for purposes of this disclosure are not signals per se. Example computer-storage memory devices include hard disks, flash drives, solid state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number an organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device, CPU, GPU, ASIC, system on chip (SoC), or the like for provisioning new VMs when configured to execute the instructions described herein.

Processor(s) 114 may include any quantity of processing units that read data from various entities, such as memory 112 or I/O components 120. Specifically, processor(s) 114 are programmed to execute computer-executable instructions for implementing aspects of the disclosure. The instructions may be performed by the processor, by multiple processors within the computing device 100, or by a processor external to the client computing device 100. In some examples, the processor(s) 114 are programmed to execute instructions such as those illustrated in the flow charts discussed below and depicted in the accompanying figures. Moreover, in some examples, the processor(s) 114 represent an implementation of analog techniques to perform the operations described herein. For example, the operations are performed by an analog client computing device 100 and/or a digital client computing device 100.

Presentation component(s) 116 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 100, across a wired connection, or in other ways. I/O ports 118 allow computing device 100 to be logically coupled to other devices including I/O components 120, some of which may be built in. Example I/O components 120 include, for example but without limitation, a microphone, joystick, game pad, satellite dish, scanner, printer, wireless device, etc.

The computing device 100 may communicate over a network 130 via network component 124 using logical connections to one or more remote computers. In some examples, the network component 124 includes a network interface card and/or computer-executable instructions (e.g., a driver) for operating the network interface card. Communication between the computing device 100 and other devices may occur using any protocol or mechanism over any wired or wireless connection. In some examples, network component 124 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 124 communicates over wireless communication link 126 and/or a wired communication link 126a across network 130 to a cloud environment 128, such as the cloud-computing environment depicted in FIG. 12. Various different examples of communication links 126 and 126a include a wireless connection, a wired connection, and/or a dedicated link, and in some examples, at least a portion is routed through the Internet.

The network 130 may include any computer network or combination thereof. Examples of computer networks configurable to operate as network 130 include, without limitation, a wireless network; landline; cable line; digital subscriber line (DSL): fiber-optic line; cellular network (e.g., 3G, 4G, 5G, etc.); local area network (LAN); wide area network (WAN), metropolitan area network (MAN); or the like. The network 130 is not limited, however, to connections coupling separate computer units. Rather, the network 130 may also include subsystems that transfer data between servers or computing devices. For example, the network 130 may also include a point-to-point connection, the Internet, an Ethernet, an electrical bus, a neural network, or other internal system. Such networking architectures are well known and need not be discussed at depth herein.

Figure 2:
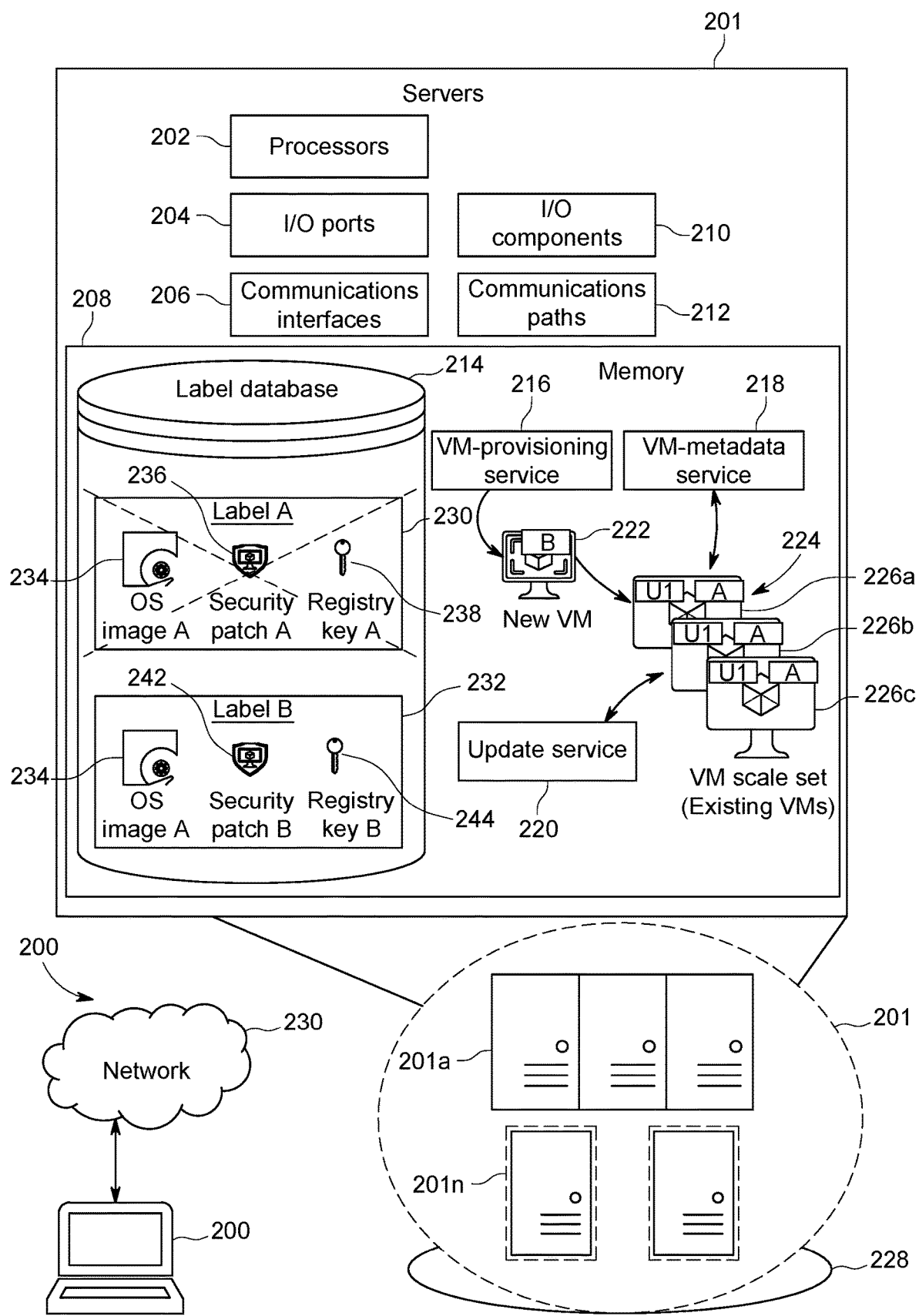
FIG. 2 illustrates a block diagram of a networking environment for machine learning the correct software image for a new VM to provision for a VM scale set.

FIG. 2 illustrates a block diagram of a networking environment for machine learning the correct software image for a new VM that is being provisioned for a VM scale set. The depicted networking environment involves a client computing device 200 and a cloud environment 228 that communicate over network 230. In reference to FIG. 1, computing device 200 represents any number of computing devices 100, cloud environment 228 represents a cloud infrastructure similar to cloud environment 128 or 1200 (mentioned below in FIG. 12), and network 230 represents network 130.

Computing device 200 represents any type of client computing device 100 configured to access online resources, such as a webpage, cloud-based application, or other such resource. For example, computing device 200 may be a smartphone with a Web browser that is able to access webpages over the World Wide Web. Myriad other examples exist and need not be discussed at length herein other than to generally state that the computing device 200 is able to access various resources in the cloud environment 228.

Cloud environment 228 includes various servers 201 that may be any type of server or remote computing device, either as a dedicated, relational, virtual, private, public, hybrid, or other cloud-based resource. As depicted, servers 201 include a mixture of physical servers 201a and virtual servers 201n, the latter of which are set up as VMs running inside of cloud environment 228. For the sake of clarity, these physical servers 201a and virtual servers 201n are collectively discussed as "servers 201," unless otherwise indicated.

Like computing device 100 mentioned above, servers 201 include or have access to one or more processors 202, I/O ports 204, communications interfaces 206, computer-storage memory 208, I/O components 210, and a communications path 212. Server topologies and processing resources are generally well known to those in the art, and need not be discussed at length herein, other than to say that any server configuration may be used to execute the VM-provisioning, VM-metadata, and update services referenced herein.

Memory 208 represents a quantity of computer-storage memory and memory devices that store executable instructions and data for machine learning the correct OS and software to use in provisioning new VMs. In some examples, memory 208 stores a label database 214, a VM-provisioning service 216, a VM-metadata service 218, and an update service 220. Together, these components operate to provision a new VM 222 to add to a VM scale set 224 that already includes a number of existing VMs (shown as existing VMs 226a-c). To do so, implementations and examples analyze metadata of the existing VMs 226a-c to machine learn the correct label of OS or other software to use when provisioning the new VM 222 so that the new VM 222 matches the existing VMs 226a-c. Operationally, this machine-learning is performed by the VM-metadata service 218 using the operations discussed below, and the VM-provisioning service 216 provisions the new VM 222 using the OS or software that is machine learned from metadata of the current OS or software running on the existing VMs 226a-c.

The label database 214 is a repository storing different versions of software (e.g., an OS), security patches for such software, and operational settings (e.g., registry keys) for VMs to use the software. Images for OSes and other software for new VMs are stored as different "labels" in the label database 214. To illustrate this point, two labels A 230 and B 232 are shown. Though, in operation, many different labels may be stored and made available.

In the depicted example, labels A 230 and B 232 include the same image of an OS (OS image A 234) along with different security patches and operational settings. As shown, label A 230 is a combination of OS image A 234, security patch A 236, and registry key A 238. Label B is a combination of OS image A 234, security patch B 242, and registry key B 244. In some examples, the OS image A 234 may be a particular version of the MICROSOFT WINDOWS® OS (e.g., WINDOWS® version 2004). Yet, the two labels A 230 and B 232 in their respective security patches (security patches A 236 and B 234), as well as specific operational settings (shown as registry key A 238 and registry key B 244). Security patch A 236 is one security patch (e.g., the October 2020 security patch) for the particular version of the OS image A 234 (e.g., WINDOWS® version 2004), and security patch B 242 is a different security patch (e.g., the December 2020 security patch) than security patch A 236.

Additionally or alternatively, the operational settings, which are illustrated in the accompanying figures as registry keys, differ between the two labels A 230 and B 232. As shown, label A 230 includes the OS image A 234, the security patch A 236, and one or more operational settings (depicted as registry key A 238). For example, the OS image A 234 may be a particular version of WINDOWS® OS (e.g., WINDOWS® version 2004), the security patch A 236 may be a specific monthly security patch (e.g., October 2020 security patch) for the particular version of the WINDOWS® OS, and the registry key A 238 may be a specific alphanumeric key used by the particular version of the WINDOWS® OS and/or the specific security patch. Label B 232 includes the same OS image A 234 but different security patch B 242 and operational setting 244. The depicted example shows two different registry keys A 238 and B 244 included in the different labels A 230 and B 232, respectively. Different operational parameters may be used and unique to the stored labels, including, for example but without limitation, registry keys, collections of server roles being active or disabled, transport layer security (TLS) settings, a container version, particular SQL server patch, particular software patches (e.g., MICROSOFT OFFICE®, SQL SERVER®, etc.), or any other operational setting that is used to install, run, and/or operate the disclosed software in provisioned VMs.

Over time, labels change, become obsolete, and/or are deleted from the label database 214. The large dotted "X" over label A 230 illustrates that label A 230 has been deleted from the label database 214—while label B 232 remains. This deletion may be the result of the security patch A 236 or operational setting (registry key 238) becoming outdated. Label B 232 is created and kept in the label database 214 to replace label A 230, e.g., because label B 232 includes up-to-date, or fresh, security patches or operational parameters. This is but one illustration of a label being deleted. Another reason for deleting a label is that the OS image A 234, or a particular software image, gets replaced by a new OS (or software) image. For instance, the WINDOWS® version 2004 may be replaced by a new version of the WINDOWS® OS (e.g., WINDOWS® version 20H2). This new OS or software image may be referred to by an alphanumeric new stock-keeping unit (SKU). For example, the WINDOWS® version 20H2 has a different SKU (e.g., 123.43.1.1111) than the WINDOWS® version 2004 SKU (e.g., 123.43.1.1110). Thus, the particular OS and software images in the various labels of the label database 214 are associated with their own SKUs.

The disclosed OSes, security patches, and operational parameters are provided merely as examples and are not meant to limit all implementations. Also, while only two labels are shown in the label database 214, in actuality, the label database 214 actually stores numerous different labels of different software images, security patches, and/or operational settings that may be used to provision VMs.

The VM scale set 224 includes one or more existing VMs, shown as existing VMs 226a-c. For any number of reasons, the new VM 222 is scheduled to be provisioned and added to the VM scale set 224. To work properly, the new VM 222 may need to be provisioned with the same OS and software of the existing VMs 226*a-c*. Yet, as illustrated, the existing VMs 226*a-c* of the VM scale set 224 were created (or provisioned) with the label A 230 software that has been deleted from the label database 214 before the new VM 222 is provisioned. The existing VMs 226*a-c*—which, again, were provisioned with now-deleted label A 230—include one or more updates that were provided by the update service 220. Specifically, the update service 220 is a service that automatically updates the software on running VMs. An example of update service 220 includes, without limitation, WINDOWS® SERVER UPDATE SERVICES (or "WSUS"); though, any other update service may be used. To represent that the originally provisioned label A 230 has been updated, update blocks illustrated as "U1" are shown on each of the existing VMs 226*a-c*. This signifies that label A 230 has been updated in some fashion, such as with the new security patch B 242, the new operation setting 244 (e.g., registry key), or the like. To summarize, the existing VMs 226*a-c* were originally set up with the label A 230, but have since been updated with update U1.

For the sake of clarity, only one update is described in this disclosure, but implementations and examples may search, analyze, and use multiple updates to the existing VMs 226*a-c* in machine learning the correct label B 232 to use for the new VM 222. So update U1 referenced herein contemplates any number of updates (e.g., U2, U3, U4, etc.). Software from any of these updates—or combinations thereof—may be used in the same manner as the software described in U1.

In some implementations and examples, the VM-metadata service 218 analyzes the software running on the existing VMs 226*a-c* of the VM scale set 224 to which the new VM 222 is to be added and identifies the updates U1 that were added. These updates are used by the VM-metadata service 218 to identify a different label to use in provisioning the new VM 222 to operationally match the existing VMs 226*a-c*. For example, U1 may indicate that the existing VMs 226*a-c* are operating with OS image A 234 and security patch B 242. When the link to label A 230 is broken, the VM-metadata service 218 searches the label database 214 for another label that has the same configuration as the U1 update, in this case the different security patch B 242. This searching reveals label B 232 mirrors label A 230 except for the updated security patch B 242 and new operational setting 244. The VM-metadata service 218 may deem label B 232 to be an operational replacement for now-deleted label A 230, effectively machine learning a new label to use in provisioning the new VM 222—based on the content of update U1.

Thus, the VM-provisioning service 216 no long returns an error after trying to create the new VM 222 when label A 230 of the existing VMs 226*a-c* is broken or deleted. Instead, the VM-provisioning service 216 is provided with label B 232 and is able to create the new VM 222 for addition to the VM scale set 224. In some implementations, the disclosed machine learning of an equivalent label for the new VM 222 and provisioning the new VM 222 is performed automatically. without user intervention. Such automation dramatically reduces the user friction in provisioning new VMs, reduces wasted processing for generating VMs that cannot be provisioned properly, and nearly eliminates the need to reach out to customer service to provision new VMs.

Additional details and operations for machine learning the appropriate label to use and accordingly provisioning the new VM 222 are illustrated further in FIGS. 3-6. These FIGS. 3-6 are presented in a sequential fashion to illustrate different operations at different sequential times, which are shown as hypothetical times 1-7. While these FIGS. 3-6 collectively demonstrate sequential steps, the implementations and examples discussed herein are not limited to any particular sequence of operations. For example, the disclosed operations may be performed out of the sequence depicted, in parallel, or a combination thereof.

Figure 3:
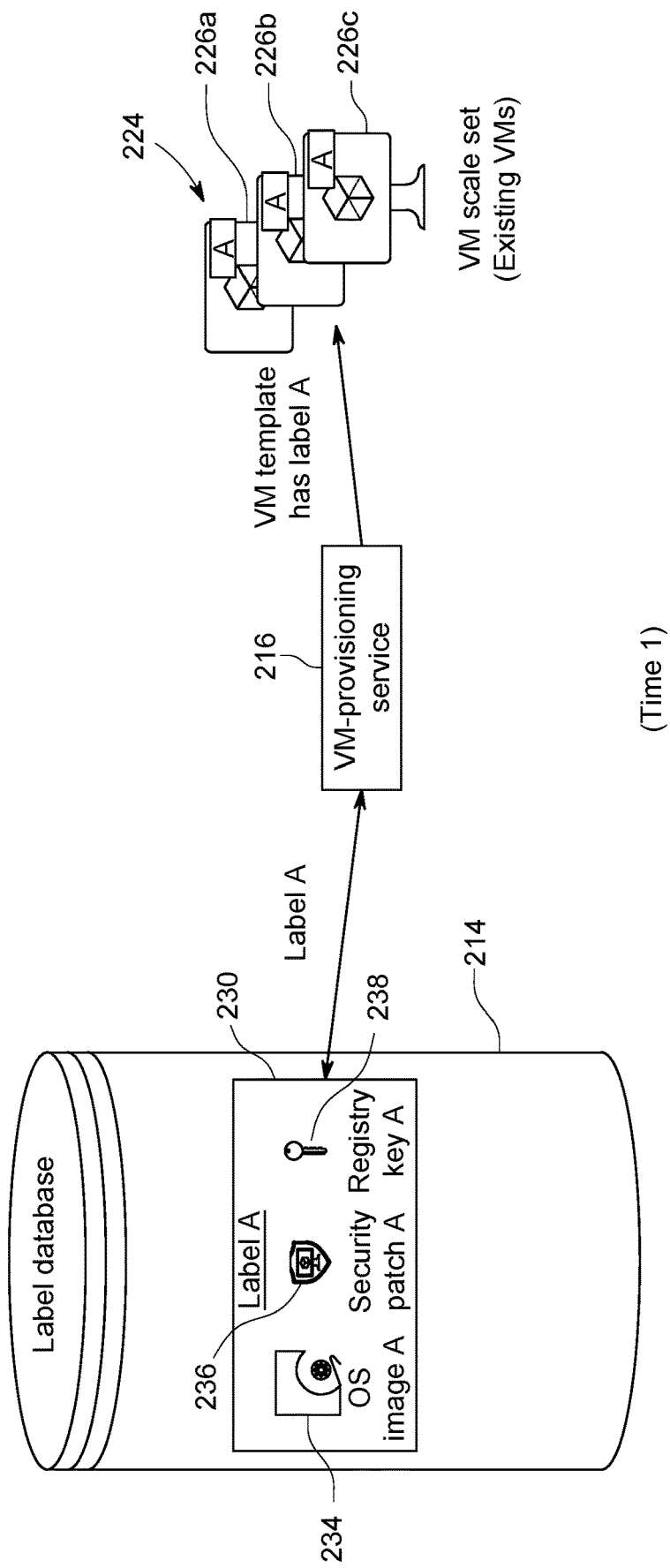
FIG. 3 illustrates a block diagram of a VM-provisioning service initially creating existing VMs for a VM scale.

FIG. 3 illustrates a block diagram of the VM-provisioning service 216 initially creating the existing VMs 226*a-c* of the VM scale set 224 at a first time (Time 1). At Time 1, the VM-provisioning service 216 executes a request to create the VM scale set 224 with the three VMs 226*a-c* by accessing the label database 214 and retrieving label A 230. The VM-provisioning service 216 creates (e.g., instantiates) the three VMs 226*a-c* with label A 230. During Time 1, the connection to label A 230 is functional, and label 230 has not yet been deleted or otherwise changed.

Figure 4:
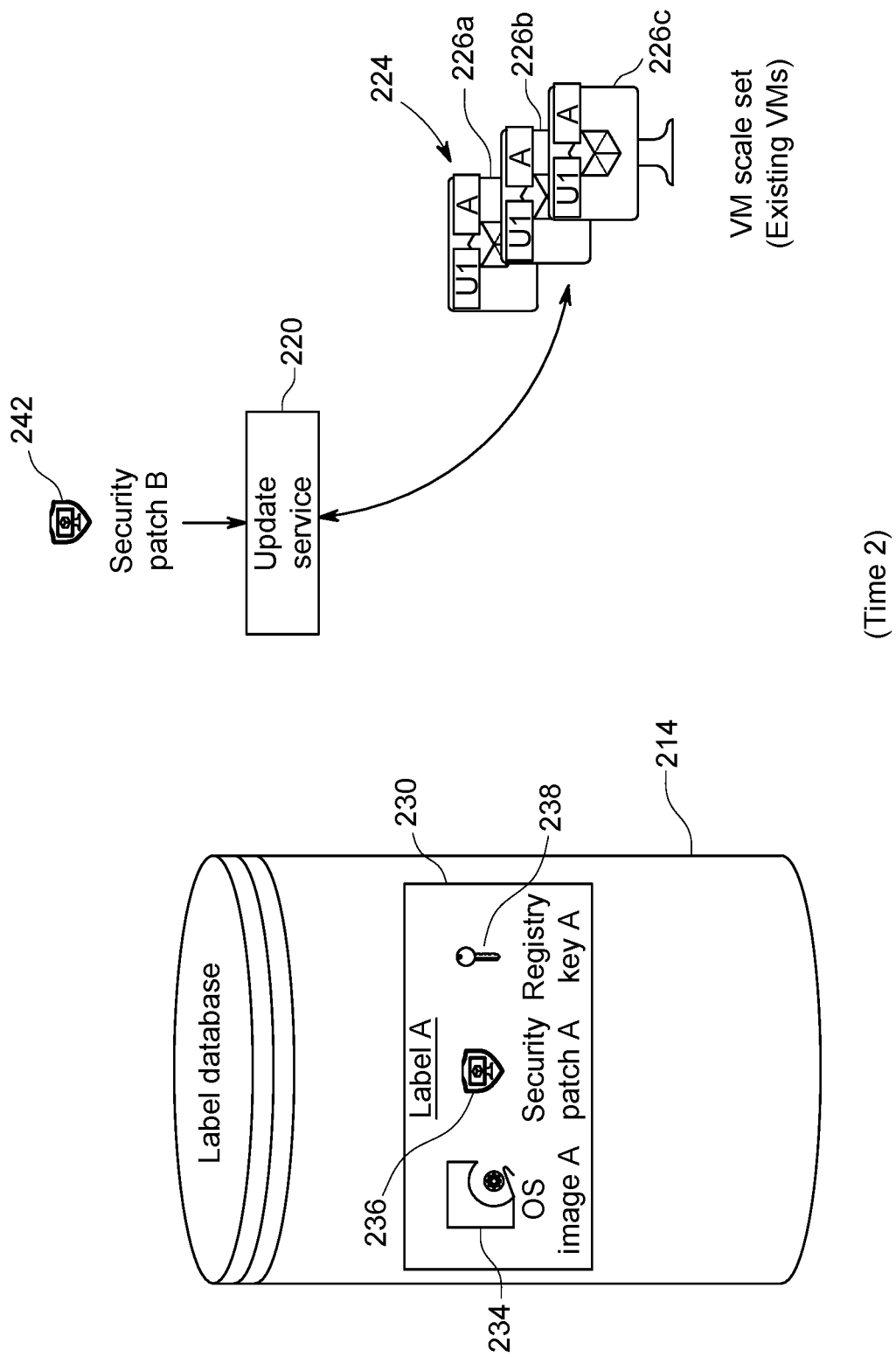
FIG. 4 illustrates a block diagram of an update service transmitting and installing an update on existing VMs of a VM scale set.

FIG. 4 illustrates a block diagram of the update service 220 transmitting and installing an update UI on existing VMs 226*a-c* of the VM scale set 224 at a second time (Time 2) that follows Time 1. The update service 220 installs security patch B 242 on the existing VMs 226*a-c*. For example, the update service WSUS may install a particular security patch for the OS running on the existing VMs 226*a-c*. Such updates may be performed automatically and update the software of label A 230 that was originally used to provision the existing VMs 236*a-c*. Thus, at Time 2, the VM scale set 224 comprises existing VMs 226*a-c* with label A 230 modified by updated U1.

Figure 5:
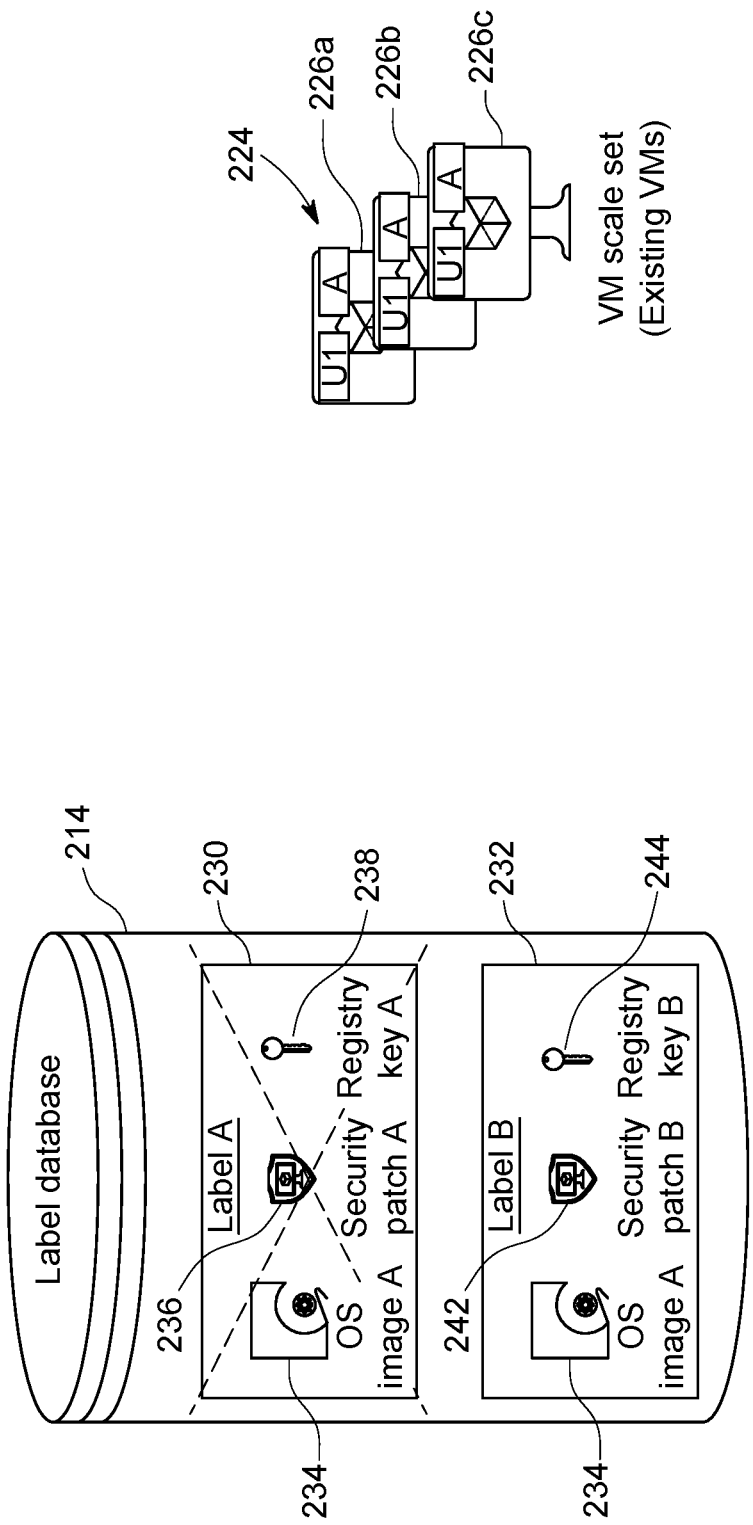
FIG. 5 illustrates a block diagram showing a software label that includes various software being deleted from a label database in a cloud environment.

FIG. 5 illustrates a block diagram that shows label A 230 being deleted, or removed, from the label database 214 in the cloud environment 228. As depicted, label A 230 is deleted at Time 3, which follows previously discussed Times 1 and 2. In the illustrated example, label A 230 is deleted because it contains an outdated security patch A 236 and/or operational settings 238 (e.g., registry keys). And label B 232 is generated and stored in the label database 214. Label B 232 includes the same OS image A 234 of label A 230 with a different security patch B 242 and operational settings 244 (e.g., registry keys). This is just one example. Labels may be deleted for myriad reasons, e.g., a new SKU for the software imaged, new security patches, new operational settings, or the like.

Figure 6:
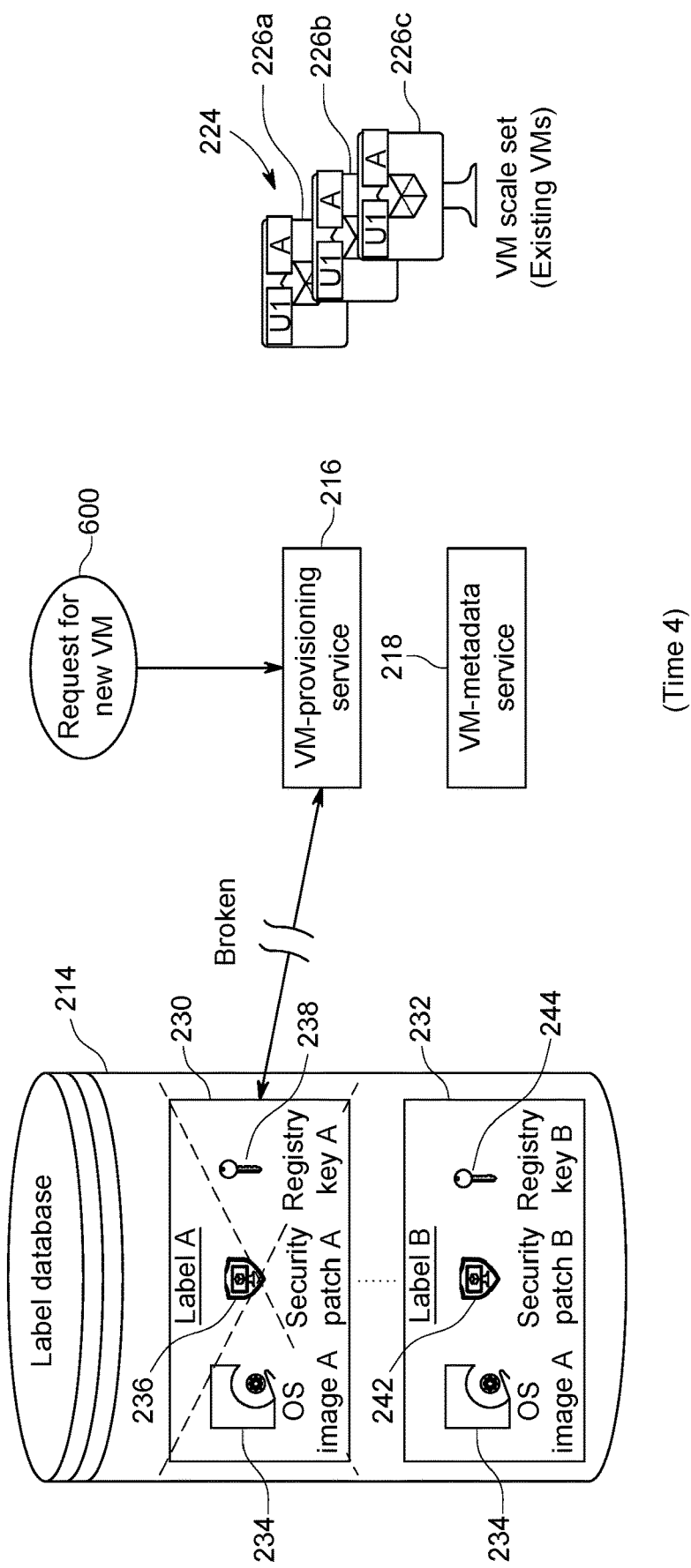
FIG. 6 illustrates a block diagram that shows a request to scale up a VM scale set by adding a new VM.

FIG. 6 illustrates a block diagram that shows a request 600 to scale up the VM scale set 224 by adding the new VM 222. In some implementations and examples, this request is received at Time 4, which follows previously discussed Times 1-3. The request 600 for the new VM may be manually requested by a client or automatically generated to scale up the VM scale set 224—for instance, based on applications requiring increases in resource usage (e.g., CPU, GPU, ASIC, memory, or network traffic). The VM-provisioning service 216 receives the request 600 and attempts to retrieve label A 230 that was used to provision the existing VMs 226*a-c* of the VM scale set 224. Again, label A 230 has been deleted, or otherwise removed, from the label database 214, which would traditionally create an error that would need to be elevated to a client—client who, in turn, would likely have to manually provision the new VM 222 or reach out to customer support. With label A 230 deleted, the implementations and examples look to automatically (without user intervention) machine learn the correct label B 232 to use in provisioning the new VM 222.

Figure 7:
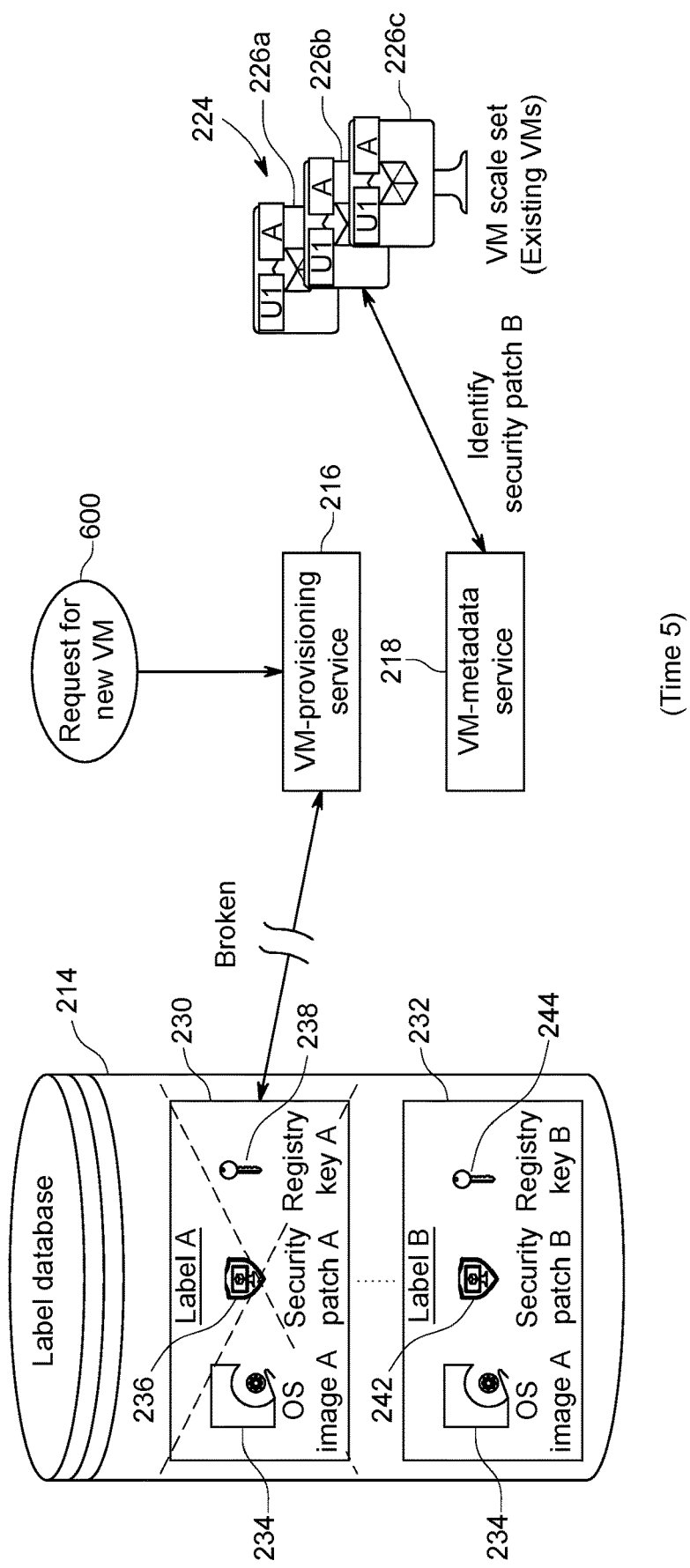
FIG. 7 illustrates a block diagram that shows a VM-metadata service analyzing metadata of software running on existing VMs in order to identify a new label in a label database for provisioning a new VM.

FIG. 7 illustrates a block diagram that shows the VM-metadata service 218 analyzing the metadata of the software for label A 230 and update U1 that are running on the existing VMs 226a-c in order to then find a new label in the label database 214 to use in provisioning the requested new VM 222. In some implementations and examples, this analysis is performed at Time 5, which follows previously discussed Times 1-4. In operation, the VM-metadata service 218 analyzes the metadata associated with the update U1 to identify that security patch B 242 is running as well as the metadata associated with the label A 230 to identify that it, too, is running on the existing VMs 226a-c. This metadata may indicate a particular SKU or other alphanumeric identifier that are associated with security patch B 242 and the various parts of label A 230 (e.g., OS image 234, security patch 236, operational settings 238). Other examples of such metadata include, without limitation, a particular build number of an OS, revision to a build, updates to a build, build version, version number, container tag, or the like. These are just some of the examples of metadata that may indicate the different software, updates, and operational settings of a label. Any updated software may be similarly identified from its associated metadata by the VM-metadata service 218. Once the update U1 and the original label A 230—and its constituent software—are identified, the VM-metadata service 218 uses this information to locate an operationally equivalent label in the label database 214.

Figure 8:
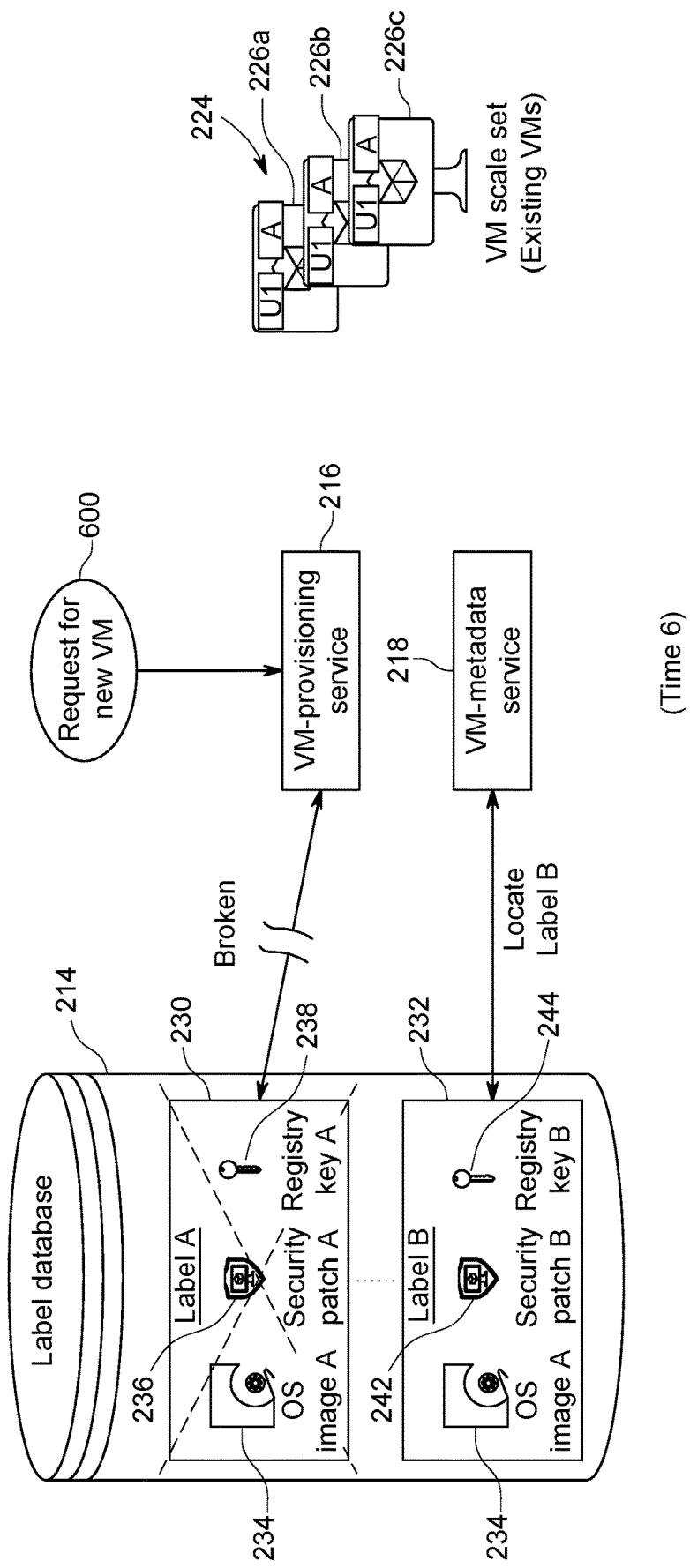
FIG. 8 illustrates a block diagram of the VM-metadata service locating a different label to use in provisioning a new VM based on the current software being run on existing VMs.

FIG. 8 illustrates a block diagram of the VM-metadata service 218 different label B 232 to use in provisioning the new VM 222 based on the current software—label A 230 and update U1—being run on existing VMs 226a-c of the VM scale set 224. In some implementations and examples, this operation is performed at Time 6, which follows previously discussed Times 1-5. The VM-metadata service 218 searches, or submits a request to search, the label database 214 for a label of software that is operationally equivalent to label A 230 and the update U1 identified on the existing VMs 226a-c from its analyzed metadata. This leads the VM-metadata service 218 to label B 232 because label B 232 includes the OS image A 234 that is also in label A 230 and the security patch B 242 that was included as part of update U1. Thus, the VM-metadata service 218 uses the metadata of the existing VMs 226a-c to identify label B 232 that may then be used to provision the new VM 222 being requested.

Some implementations locate label B 232 by searching for just the software of update U1. For example, update U1 included the security patch B 242, which was identified in label B 232. Other implementations and examples search for a combination of (1) software in the update U1 and (2) software of label A 230 that was originally used in the provisioning of the existing VMs 226a-c. For example, the security patch B 242 of update U1 and the OS image A 234 of label A 230 may be used to identify label B 232, because label B 232 has both.

In still another example, multiple updates U1, U2, and U3 may have been downloaded to the existing VMs 226a-c, two of which include the OS image A 234 and the latter of which includes a new SKU for an OS image (e.g., OS image B). These updates U1-U3 may also include different security patches. In such a scenario, the VM-metadata service 218 identifies the different OS images and security patches from their respective metadata and locates a label in the label database 214 that includes the latest OS image (e.g., not-shown OS image B) and security patch, and then uses that label (e.g., not-shown label C) to provision the new VM 222. In other words, the VM-metadata service 218 machine learns that OS image B and the latest security patch from the updates are to be used for the new VM 222, even though the existing VMs 226a-c were originally provisioned with a prior OS image A 234.

Having described some alternative examples, attention is focused back on the running example of the VM-metadata service 218 identifying label B 232.

Figure 9:
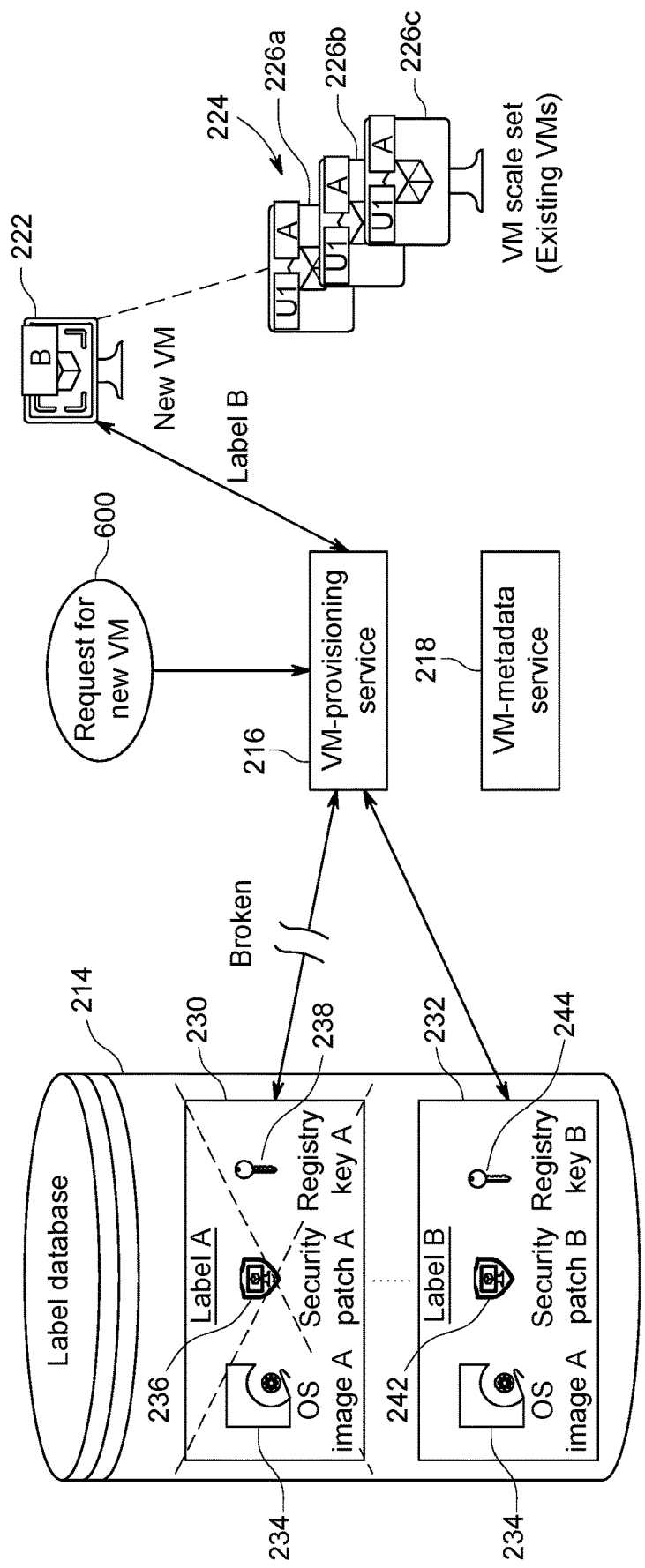
FIG. 9 is a block diagram of a VM-provisioning service provisioning a new VM with a new label identified using metadata of existing VMs.

FIG. 9 illustrates a block diagram of the VM-provisioning service 216 provisioning the new VM 222 with the new label B 232 identified using the metadata of the existing VMs 226a-c. In some implementations and examples, this operation is performed at Time 7, which follows previously discussed Times 1-6. The VM-provisioning service 216 is configured to create the instance of new VM 222 using the machine-learned label B 232 that is determined to be operationally equivalent to what is running on the existing VMs 226a-c. As illustrated, the new VM 222 is provisioned with label B 232, which, in comparison to label A 230, includes both the OS image A 234 and the security patch B 242. Thus, the new VM 222 and the existing VMs 226a-c both include the OS image A 234 and the latest security patch B 242, making the new VM 222 compatible with the existing VMs 226a-c of the VM scale set 224.

Figure 10:
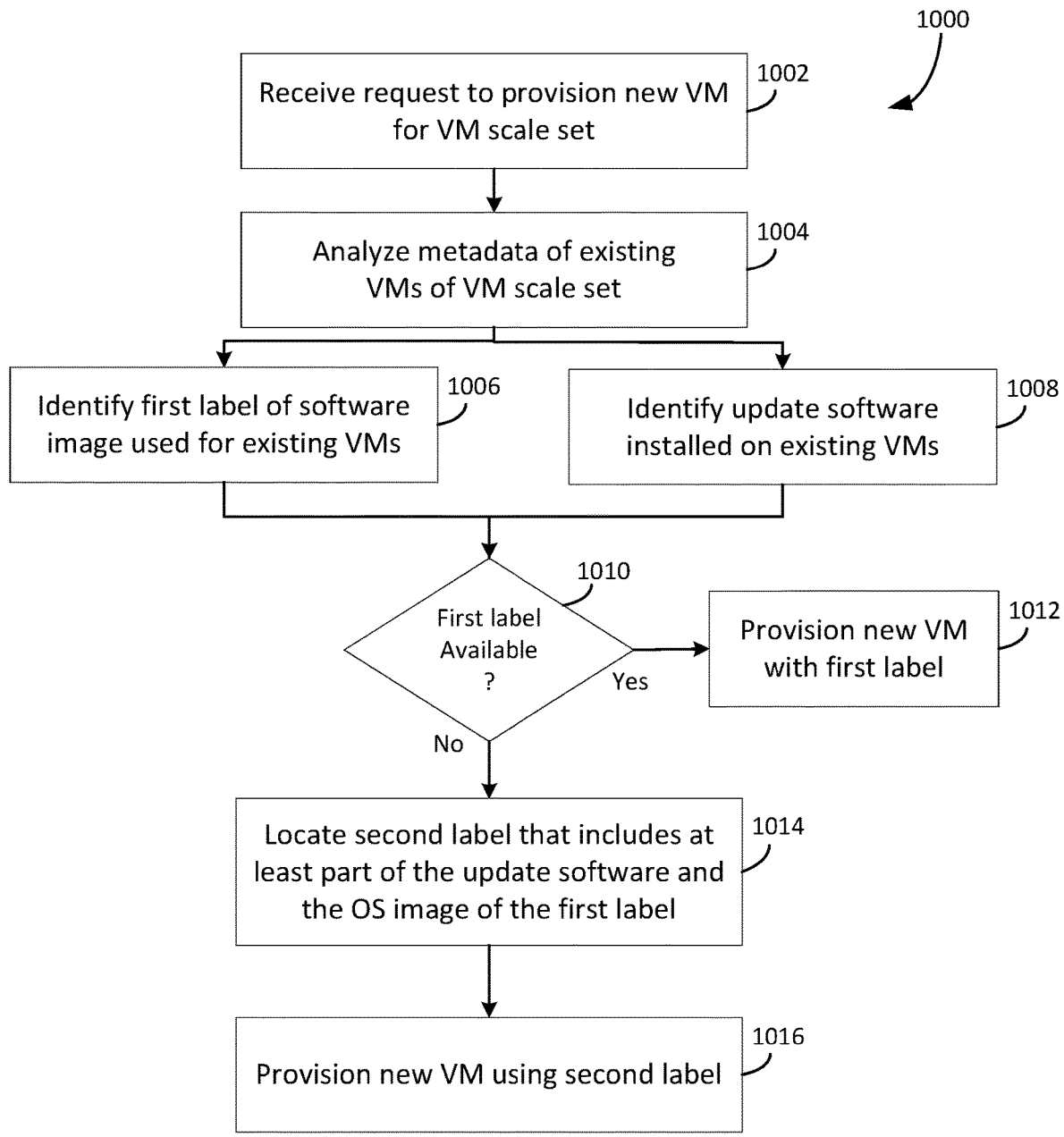
FIG. 10 is a flow chart diagram illustrating operations for provisioning a new VM using an OS image and a portion of an update to existing VMs.

FIG. 10 is a flow chart diagram illustrating operations 1000 for provisioning a new VM for a VM scale set using the OS image and a portion of an update on the existing VMs. As shown at 1002, a request for a new VM to be added to the VM scale set is received. This request may be initiated manually by a user or automatically by rules that dictate scaling the VM scale set up and down to accommodate surges in cloud resource demands. The previously discussed VM-metadata service analyzes the metadata of the software running on the existing VMs, as shown at 1004. This is done to identify a first label specifying an OS image being executed by the existing VMs. By analyzing the metadata of the existing VMs, the VM-metadata service is able to identify a first label used to create the existing VMs, as shown at 1006, and also any update software that has been installed on the existing VMs (e.g., security patches, operational settings, etc.), as shown at 1008.

The VM-metadata service checks a label database to determine whether the first label used to create the existing VMs is still available, as shown at 1010. If so, the new VM is provisioned with that label, as shown at 1012. If not, the VM-metadata service locates a second label that includes at least part of the software update and the OS image of the first label, as shown at 1014. For example, if the software update included a certain security patch, the VM-metadata service searches for a label with that particular software update. As shown at 1016, the new VM is then provisioned with the second label, which includes the OS image of the first label and a portion of the software update running on the existing VMs.

Figure 11:
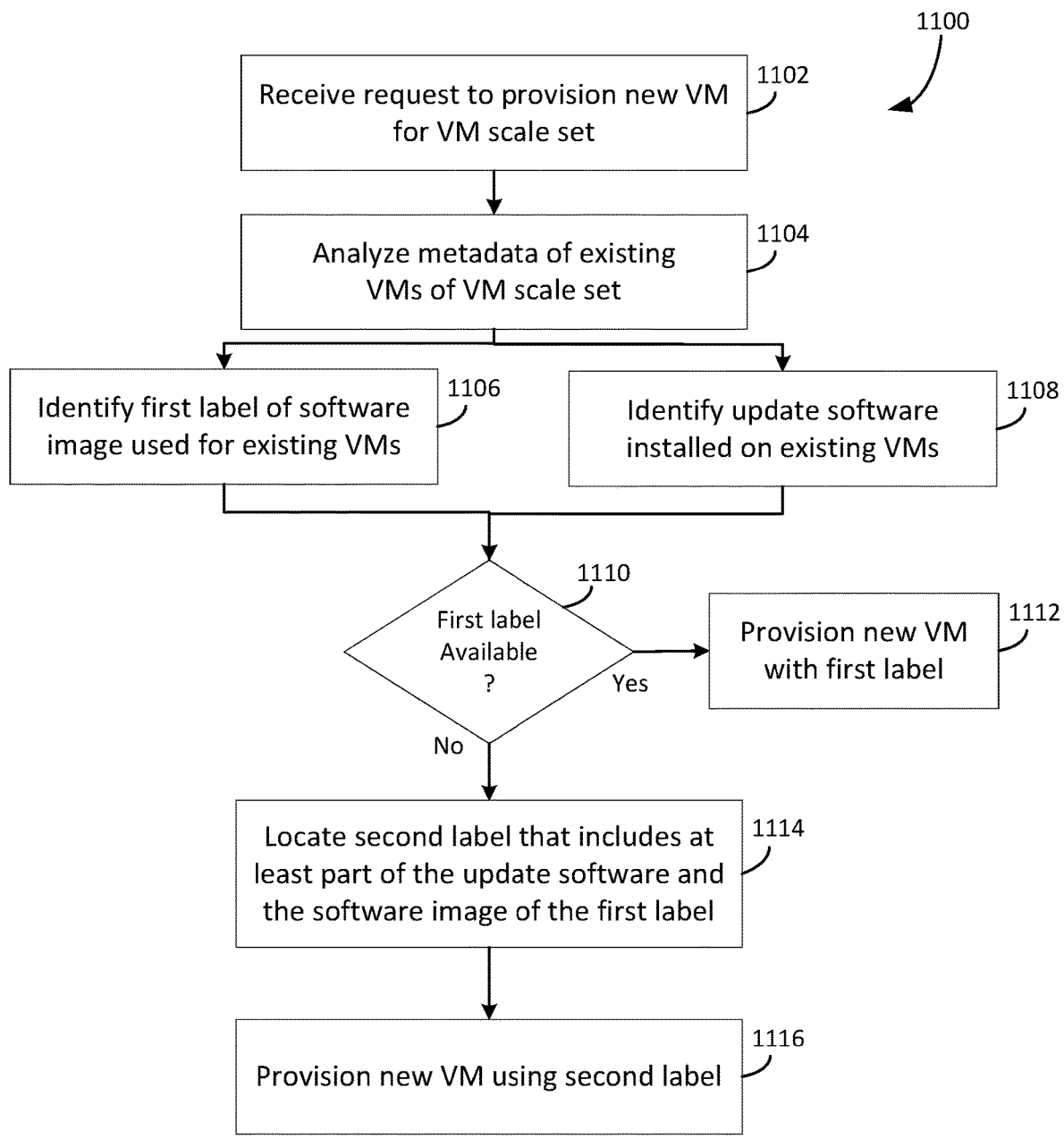
FIG. 11 is a flow chart diagram illustrating operations for provisioning a new VM using a software image and a portion of an update on existing VMs.

FIG. 11 is a flow chart diagram illustrating operations 1100 for provisioning a new VM for a VM scale set using software images and a portion of an update on the existing VMs. As shown at 1102, a request for a new VM to be added to the VM scale set is received. The VM-metadata service analyzes the metadata of the software running on the existing VMs, as shown at 1104. This is done to identify a first label specifying particular software (e.g., a particular application) being executed by the existing VMs. By analyzing the metadata of the existing VMs, the VM-metadata service is able to identify a first label used to create the existing VMs, as shown at 1106, and also any update software that has been installed on the existing VMs (e.g., security patches, operational settings, etc.), as shown at 1105.

The VM-metadata service checks a label database to determine whether the first label used to create the existing VMs is still available, as shown at 1010. If so, the new VM is provisioned with that label, as shown at 1012. If not, the VM-metadata service locates a second label that includes at least part of the software update and the software image of the first label, as shown at 1114. For example, if the software update included a certain security patch, the VM-metadata service searches for a label with that particular software update. As shown at 1116, the new VM is then provisioned with the second label, which includes the software image of the first label and a portion of the software update running on the existing VMs.

Example Cloud-Computing Environment

Figure 12:
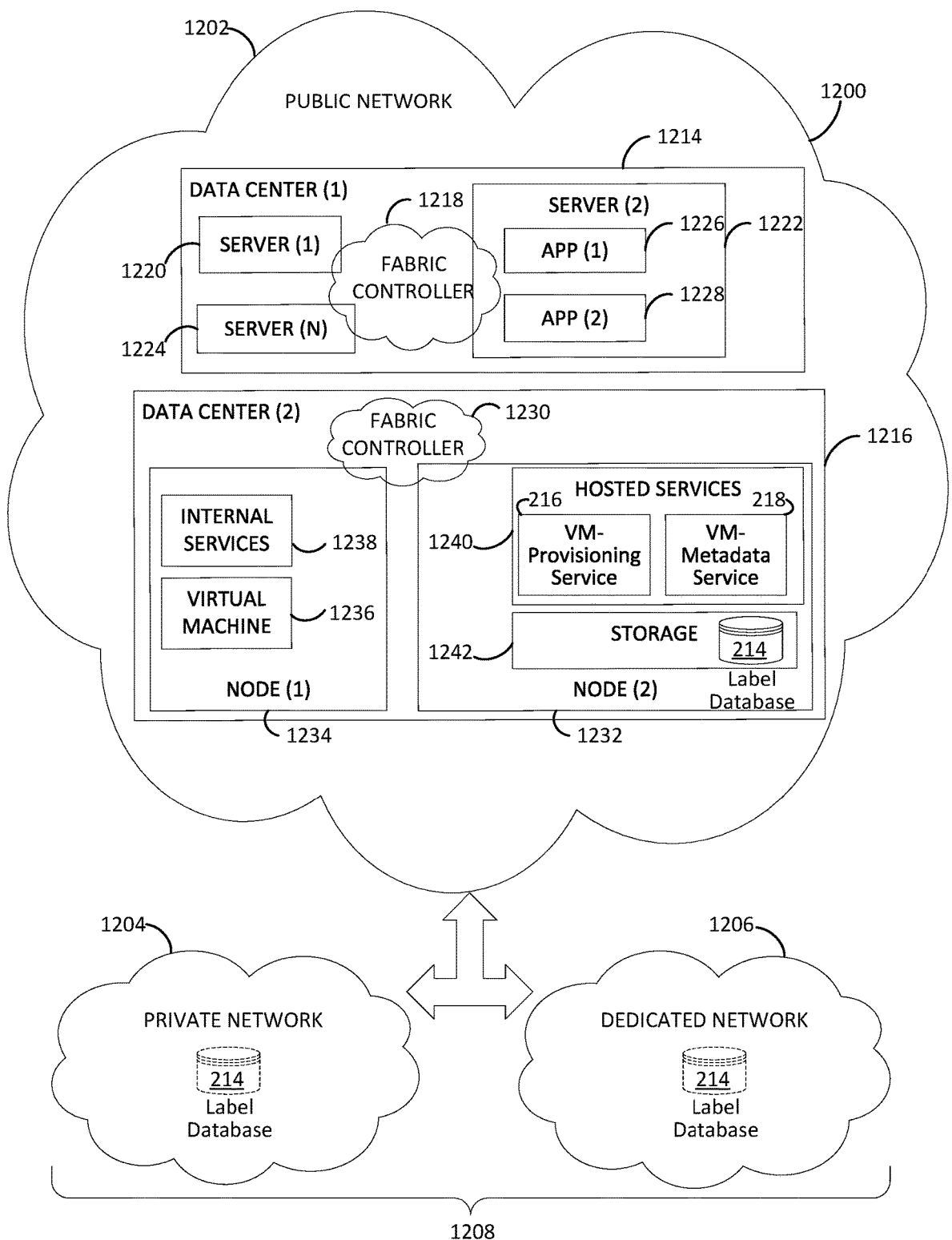
FIG. 12 illustrates a block diagram of an example cloud-computing environment.

FIG. 12 illustrates a block diagram of one example of a cloud-computing environment 1200, in accordance with some of the disclosed implementations and examples. Cloud-computing environment 1200 includes a public network 1202, a private network 1204, and a dedicated network 1206. Public network 1202 may be a public cloud-based network of computing resources, for example. Private network 804 may be a private enterprise network or private cloud-based network of computing resources. And dedicated network 1206 may be a third-party network or dedicated cloud-based network of computing resources.

Hybrid cloud 1208 may include any combination of public network 1202, private network 1204, and dedicated network 1206. For example, dedicated network 1206 may be optional, with hybrid cloud 1208 comprised of public network 1202 and private network 1204.

Public network 1202 may include data centers configured to host and support operations, including tasks of a distributed application, according to the fabric controller 1218. It will be understood and appreciated that data center 1214 and data center 1216 shown in FIG. 12 are merely examples of suitable implementations for accommodating one or more distributed applications, and are not intended to suggest any limitation as to the scope of use or functionality of examples disclosed herein. Neither should data center 1214 and data center 1216 be interpreted as having any dependency or requirement related to any single resource, combination of resources, combination of servers (e.g., servers 1220 and 1224) combination of nodes (e.g., nodes 1232 and 1234), or a set of application programming interfaces (APIs) to access the resources, servers, and/or nodes.

Data center 1214 illustrates a data center comprising a plurality of servers, such as servers 1220 and 1224. A fabric controller 1218 is responsible for automatically managing the servers 1220 and 1224 and distributing tasks and other resources within the data center 1214. By way of example, the fabric controller 1218 may rely on a service model (e.g., designed by a customer that owns the distributed application) to provide guidance on how, where, and when to configure server 1222 and how, where, and when to place application 1226 and application 1228 thereon. One or more role instances of a distributed application may be placed on one or more of the servers 1220 and 1224 of data center 1214, where the one or more role instances may represent the portions of software, component programs, or instances of roles that participate in the distributed application. In other examples, one or more of the role instances may represent stored data that are accessible to the distributed application.

Data center 1216 illustrates a data center comprising a plurality of nodes, such as node 1232 and node 1234. One or more virtual machines may run on nodes of data center 1216, such as virtual machine 1236 of node 1234 for example. Although FIG. 12 depicts a single virtual node on a single node of data center 1216, any number of virtual nodes may be implemented on any number of nodes of the data center in accordance with illustrative implementations and examples of the disclosure. Generally, virtual machine 1236 is allocated to role instances of a distributed application, or service application, based on demands (e.g., amount of processing load) placed on the distributed application. As used herein, the phrase "virtual machine," or VM, is not meant to be limiting, and may refer to any software, application, operating system, or program that is executed by a processing unit to underlie the functionality of the role instances allocated thereto. Further, the VMs 1236 may include processing capacity, storage locations, and other assets within the data center 1216 to properly support the allocated role instances.

In operation, the virtual machines are dynamically assigned resources on a first node and second node of the data center, and endpoints (e.g., the role instances) are dynamically placed on the virtual machines to satisfy the current processing load. In one instance, a fabric controller 1230 is responsible for automatically managing the virtual machines running on the nodes of data center 1216 and for placing the role instances and other resources (e.g., software components) within the data center 1216. By way of example, the fabric controller 1230 may rely on a service model (e.g., designed by a customer that owns the service application) to provide guidance on how, where, and when to configure the virtual machines, such as VM 1236, and how, where, and when to place the role instances thereon.

As described above, the virtual machines may be dynamically established and configured within one or more nodes of a data center. As illustrated herein, node 1232 and node 1234 may be any form of computing devices, such as, for example, a personal computer, a desktop computer, a laptop computer, a mobile device, a consumer electronic device, a server, and like. VMs machine(s) 1236, while simultaneously hosting other virtual machines carved out for supporting other tenants of the data center 1216, such as internal services 1238, hosted services 1240, and storage 1242. Often, the role instances may include endpoints of distinct service applications owned by different customers.

In implementations and examples, the label database 214 is stored in storage 1242. Alternatively, the label database 214 may be stored in the private network 1204 or the dedicated network 1206, as indicated by the shown dotted depictions.

In some implementations and examples, the hosted services 1240 include the previously discussed VM-provisioning service 216 and the VM-metadata service 218. These services operate to create, maintain, and query the code database 1228, which may be stored and hosted in the public network 1202, the private network 1204, or the dedicated network 1206, as well as any combination thereof.

Typically, each of the nodes include, or is linked to, some form of a computing unit (e.g., CPU, GPU, ASIC, etc.) to support operations of the component(s) running thereon. As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the nodes to enable each device to perform a variety of processes and operations. In another instance, the computing unit may encompass a processor (not shown) coupled to the computer-readable medium (e.g., computer storage media and communication media) accommodated by each of the nodes.

The role of instances that reside on the nodes may be to support operation of service applications, and thus they may be interconnected via APIs. In one instance, one or more of these interconnections may be established via a network cloud, such as public network 1202. The network cloud serves to interconnect resources, such as the role instances, which may be distributed across various physical hosts, such as nodes 1232 and 1234. In addition, the network cloud facilitates communication over channels connecting the role instances of the service applications running in the data center 1216. By way of example, the network cloud may include, without limitation, one or more communication networks, such as LANs and/or wide area networks WANs. Such communication networks are commonplace in offices, enterprise-wide computer networks, intranets, and the Internet, and therefore need not be discussed at length herein.

Additional Examples

Some examples are directed to a method for provisioning a new VM for addition to a VM scale set comprising one or more existing VMs, such as shown by operations 1000 and 1100. The method comprises: analyzing metadata of software running on the one or more existing VMs to identify a first label specifying a software image of an OS being executed by the one or more existing VMs (1004 and 1104); identifying, from the metadata, a software update installed on the one or more existing VMs (1008 and 1108); locating a second label comprising the software update and the image of the OS specified in the first label (1014 and 1114); and provisioning the new VM with the second label based on the second label identified from the metadata (1016 and 1116). Such a method automatically provisions the new VM without user intervention even though a different label is needed than the original label used to provision the one or more existing VMs.

In some examples, the software update comprises a security patch B 242 to the OS image 234. Using the security patch provides a way to locate the second label without user intervention.

In some examples, the software update B 242 is different than another software update (security patch A 2362) that is part of the first label 230. This provides flexibility because the method is able to machine learn the correct second label to use.

In some examples, the second label 234 comprises a different security update (security patch B 242) than a security update (security patch A 236) of the first label 234. The security update provides a way to locate the second label without user intervention.

Other examples also include operations for: determining the first label A 230 with the software image of the OS (234) has been deleted from a label database 214; and performing said locating of the second label B 232 incident to the first label 230 with the software image of the OS (234) having been deleted (e.g., broken line in FIG. 6). This allows the new VM to be set up automatically even when the first label is deleted.

Other examples also include operations for selecting the second label B 232 for provisioning the new VM 222 based on the security patch B 242 of the second label B 232 being newer than another security patch A 236 associated with the first label A 230.

In some examples, the metadata of the one or more existing VMs 226*a-c* indicates an operational setting (e.g., registry key B 244) of the one or more existing VMs 226*a-c*. Operational settings provides another way to locate the second label without user intervention.

In some examples, the operational setting comprises one or more registry keys B 244 used by the one or more existing VMs 226*a-c*. Registry keys provide another way to locate the second label without user intervention.

In some examples, the operational setting comprises one or more server roles being active or disabled. Server roles provide another way to locate the second label without user intervention.

In some examples, the metadata of the one or more existing VMs comprises a stock-keeping unit (SKU) indicative of the OS. SKUs provide another way to locate the second label without user intervention.

Still other examples are directed to one or more servers 201 configured to provision a new VM for addition to a VM scale set comprising one or more existing VMs. The one or more servers 201 comprising: memory 208 embodied with executable instructions (VM-metadata service 218) for identifying a first label of a software image for provisioning the one or more existing VMs and machine learning a second label of the software image; and at least one processor 202 programmed to: analyze metadata of software running on the one or more existing VMs to identify a first label specifying a software image being executed by the one or more existing VMs (1004 and 1104); determine the first label with the software image has been deleted from a label database (1010 and 1110); identify, from the metadata, a software update installed on the one or more existing VMs (1008 and 1108); locate a second label comprising the software update and the software image specified in the first label for use in provisioning the new VM (1014 and 1114); and provisioning the new VM with the second label based on the second label located from the metadata (1016 and 1118). Such servers automatically provision the new VM without user intervention even though a different label is needed than the original label used to provision the one or more existing VMs.

In some examples, the at least one processor 202 is further programmed to: identify the first label is deleted from a label database (e.g., broken line illustrated in FIGS. 6 and 8), and locate the second label based, at least in part, on the first label being deleted from the label database (e.g., "Locate Label B" in FIG. 8). This allows the servers to machine learn the correct label to use for new VMs when labels used on existing VMs are deleted.

In some examples, the metadata of the one or more existing VMs indicates an operational setting comprising one or more registry keys used by the one or more existing VMs. Operational settings provide another way to locate the second label without user intervention.

In some examples, the second label comprises a different registry key B 244 than the one or more registry keys A 238. Registry keys provide another way to locate the second label without user intervention.

Still other examples are directed to one or more computer-storage memory 208 devices embodied with executable operations that, when executed by one or more processors 202, are configured to perform operations for provisioning a new VM 222 for a VM scale 234 comprising one or more existing VMs 226*a-c*. The instructions are executable for performing operations comprise: analyzing metadata of software running on the one or more existing VMs to identify a first label specifying a software image being executed by the one or more existing VMs (1004 and 1104); determining a path to the first label with the software image is broken (e.g, broken path in FIGS. 6 and 8); identifying, from the metadata, a software update installed on the one or more existing VMs (1008 and 1108); locating a second label comprising the software update and the software image specified in the first label for use in provisioning the new VM based on the second label identified from the metadata (1014 and 1114); and provisioning the new VM with the second label based on the second label located from the metadata (1016 and 1118). Such operations automatically provision the new VM without user intervention even though a different label is needed than the original label used to provision the one or more existing VMs.

In some examples, the software update comprises a security patch B 242 that is not in the first label A 230. Security patches another way to locate the second label without user intervention.

In some examples, the software update comprises an operational setting (e.g., registry key B 244) that is not in the first label A 230. Operational settings provide another way to locate the second label without user intervention.

In some examples, the path to the first label A 230 with the software image (e.g., label A 230) is broken due to the first label having been changed. This allows the correct label to be machine learned for new VMs 222 when labels used on existing VMs 226a-c are deleted.

Other examples include operations for selecting the second label for provisioning the new VM based on the security patch of the second label being newer than another security patch associated with the first label.

In some examples, the metadata of the one or more existing VMs 222 indicates an operational setting comprising one or more registry keys A 238 used by the one or more existing VMs 226a-c, and wherein the second label B 232 comprises a different registry key B 244 than the one or more registry keys A 238. Operational settings provide another way to locate the second label without user intervention.

While the aspects of the disclosure have been described in terms of various examples with their associated operations, a person skilled in the art would appreciate that a combination of operations from any number of different examples is also within scope of the aspects of the disclosure.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method for provisioning a new virtual machine (VM) for accommodating a cloud resource demand, the method comprising:

receiving a request for the new VM to be added to existing VMs;

analyzing metadata of software running on the existing VMs;

based on said analyzing, identifying a first label specifying a software image of an operating system (OS) being executed by the existing VMs and a software update installed on the existing VMs;

determining that the first label used to create the existing VMs is unavailable in a label database;

based on said determining, locating in the label database, without user intervention, a second label that is stored in the label database, the second label comprising at least part of the software update installed on the existing VMs, the second label including the software image of the OS specified in the first label; and provisioning the new VM with the second label located from the label database.

2. The method of claim 1, wherein the software update comprises a security patch to the OS.

3. The method of claim 1, wherein the software update is different than another software update that is part of the first label.

4. The method of claim 1, wherein the second label comprises a different security update than a security update of the first label.

5. The method of claim 1, further comprising:

determining the first label with the software image of the OS has been deleted from the label database; and performing said locating of the second label upon determining that the first label with the software image of the OS has been deleted.

6. The method of claim 1, further comprising selecting the second label for provisioning the new VM based on a security patch of the second label being newer than another security patch associated with the first label.

7. The method of claim 1, wherein the metadata of the existing VMs indicates an operational setting of the existing VMs.

8. The method of claim 7, wherein the operational setting comprises one or more registry keys used by the existing VMs.

9. The method of claim 7, wherein the operational setting comprises one or more server roles being active or disabled.

10. The method of claim 1, wherein the metadata of the existing VMs comprises a stock-keeping unit (SKU) indicative of the OS.

11. A server to provision a new virtual machine (VM) for accommodating a cloud resource demand, the server comprising:

memory embodied with executable instructions for identifying a first label of a software image executed by existing VMs and machine learning a second label of the software image; and a processor programmed to:

receive a request for the new VM to be added to the existing VMs, analyze metadata of software running on the existing VMs, identify the first label specifying the software image being executed by the existing VMs and a software update installed on the existing VMs, determine the first label used to create the existing VMs is unavailable in a label database, based on said determining, locate in the label database, without user intervention, the second label stored in the label database, the second label comprising at least part of the software update installed on the existing VMs, the second label including the software image specified in the first label, and provision the new VM with the second label located from the label database.

12. The server of claim 11, wherein the processor is further programmed to:

identify the first label is deleted from the label database, and locate the second label based, at least in part, on the first label being deleted from the label database.

13. The server of claim 11, wherein the metadata of the existing VMs indicates an operational setting comprising one or more registry keys used by the existing VMs.

14. The server of claim 13, wherein the second label comprises a different registry key than the one or more registry keys.

15. A computer-storage memory device embodied with executable operations that, when executed by a processor, are configured to perform operations for provisioning a new virtual machine (VM) for accommodating a cloud resource demand, comprising:

receiving a request for the new VM to be added to existing VMs;

analyzing metadata of software running on the existing VMs;

identifying a first label specifying a software image being executed by the existing VMs and a software update installed on the existing VMs;

determining a path to the first label used to create the existing VMs is broken;

incident to the determination that the path to the first label is broken, locating in a label database, without user intervention, a second label that is stored in the label database, the second label comprising at least part of the software update installed on the existing VMs, the second label including the software image specified in the first label; and provisioning the new VM with the second label.

16. The computer-storage memory device of claim 15, wherein the software update comprises a security patch that is not in the first label.

17. The computer-storage memory device of claim 15, wherein the software update comprises an operation setting that is not in the first label.

18. The computer-storage memory device of claim 15, wherein the path to the first label with the software image is broken due to the first label having been changed.

19. The computer-storage memory device of claim 15, further comprising selecting the second label for provisioning the new VM based on a security patch of the second label being newer than another security patch associated with the first label.

20. The computer-storage memory device of claim 15, wherein the metadata of the existing VMs indicates an operational setting comprising one or more registry keys used by the existing VMs, and wherein the second label comprises a different registry key than the one or more registry keys.

* * * * *